(12) United States Patent
Roche et al.

(10) Patent No.: US 7,326,390 B2
(45) Date of Patent: Feb. 5, 2008

(54) PRODUCTION OF TITANIA

(75) Inventors: Eric Girvan Roche, Shortland (AU);
Alan David Stuart, Shortland (AU);
Philip Ernest Grazier, Shortland (AU);
Sarah Nicholson, Ripley (AU)

(73) Assignee: BHP Billiton Innovation Pty Ltd., Melbourne, Vic (AU)

( * ) Notice: Subject to any disclaimer, the term of this patent is extended or adjusted under 35 U.S.C. 154(b) by 251 days.

(21) Appl. No.: 11/107,687

(22) Filed: Apr. 15, 2005

(65) Prior Publication Data

US 2005/0180903 A1     Aug. 18, 2005

Related U.S. Application Data

(63) Continuation-in-part of application No. PCT/AU2004/001421, filed on Oct. 15, 2004.

(30) Foreign Application Priority Data

Oct. 17, 2003  (AU) .............................. 2003905710

(51) Int. Cl.
*C01G 23/02* (2006.01)
(52) U.S. Cl. ............................ 423/82; 423/85; 423/86; 423/610; 423/615; 423/616
(58) Field of Classification Search .................. 423/82, 423/85, 86, 610, 615, 616
See application file for complete search history.

(56) References Cited

U.S. PATENT DOCUMENTS

| | | | | |
|---|---|---|---|---|
| 3,760,058 | A | * | 9/1973 | Langmesser et al. ......... 423/85 |
| 4,288,415 | A | * | 9/1981 | Rahm et al. .................. 423/82 |
| 4,288,418 | A | * | 9/1981 | Davis et al. .................. 423/83 |
| 4,986,742 | A | | 1/1991 | Denecker et al. |
| 2006/0233686 | A1 | | 10/2006 | Roche et al. |

FOREIGN PATENT DOCUMENTS

| | | |
|---|---|---|
| CA | 2014485 A1 | 10/1990 |
| JP | 05009029 | 1/1993 |
| WO | WO 02/48412 | 6/2002 |
| WO | WO 2004/035843 | 4/2004 |

* cited by examiner

*Primary Examiner*—Steven Bos
(74) *Attorney, Agent, or Firm*—Brinks Hofer Gilson & Lione; G. Peter Nichols

(57) ABSTRACT

A sulfate process for producing titania from titaniferous material is disclosed. The process includes precipitating titanyl sulfate from leach liquors containing acidic solutions of titanyl sulfate. The process is characterised by: (a) multiple stage leaching to produce leach liquors containing acidic solutions of titanyl sulfate; (b) using depleted leach liquor from a titanyl sulfate precipitation reactor in the leach steps; and (c) controlling acid concentration in the leach steps to avoid premature hydrolysis and premature precipitation.

41 Claims, 1 Drawing Sheet

PRODUCTION OF TITANIA

The present application is a continuation-in-part of PCT/AU2004/001421, filed Oct. 17, 2004, which claims priority to Australian application PR 2003905710 filed Oct. 17, 2003, which was published in English as WO 2005/038060 on Apr. 28, 2005, the entire contents of each is incorporated herein by reference.

BACKGROUND

The present invention relates to a process for producing titania from a titaniferous material.

The term "titaniferous" material is understood herein to mean any titanium-containing material, including by way of example ores, ore concentrates, and titaniferous slags.

The present invention relates particularly to the sulfate process for producing titania from titaniferous material.

The sulfate process was the first commercial process for the manufacture of titania from titaniferous ores, such as ilmenite.

A significant issue with the sulfate process is that it produces large quantities of waste iron sulfate and consumes large quantities of sulfuric acid.

The chloride process generally avoids the iron sulfate waste problem of the sulfate process and, at larger scales, is less expensive to operate than the sulfate process.

Hence, the chloride process is the currently preferred process for producing titania, particularly titania for the pigment industry.

An object of the present invention is to provide an improved sulfate process.

SUMMARY

In general terms, the present invention provides a sulfate process for producing titania from a titaniferous material (such as ilmenite) of the type which includes the steps of:

(a) leaching the solid titaniferous material with a leach solution containing sulfuric acid and forming a leach liquor that includes an acidic solution of titanyl sulfate ($TiOSO_4$) and iron sulfate ($FeSO_4$);
(b) separating the leach liquor and a residual solid phase from the leach step (a);
(c) precipitating titanyl sulfate from the leach liquor from step (b);
(d) separating the precipitated titanyl sulfate from the leach liquor;
(e) redissolving the precipitated titanyl sulfate;
(f) hydrolysing the redissolved titanyl sulfate and forming a solid phase containing hydrated titanium oxides and a liquid phase;
(g) separating the solid phase containing hydrated titanium oxides and the liquid phase;
(h) calcining the solid phase from step (e) and forming titania; and
(i) removing, for example by precipitating, iron sulfate from the leach liquor from step (b) and/or the depleted liquor from step (d).

The term "hydrated titanium oxides" is understood herein to include, by way of example, compounds that have the formula $TiO_2 \cdot 2H_2O$ and $TiO_2 \cdot H_2O$.

In addition, the term "hydrated titanium oxides" is understood herein to include compounds that are described in technical literature as titanium hydroxide ($Ti(OH)_4$).

DESCRIPTION

Figure 1:
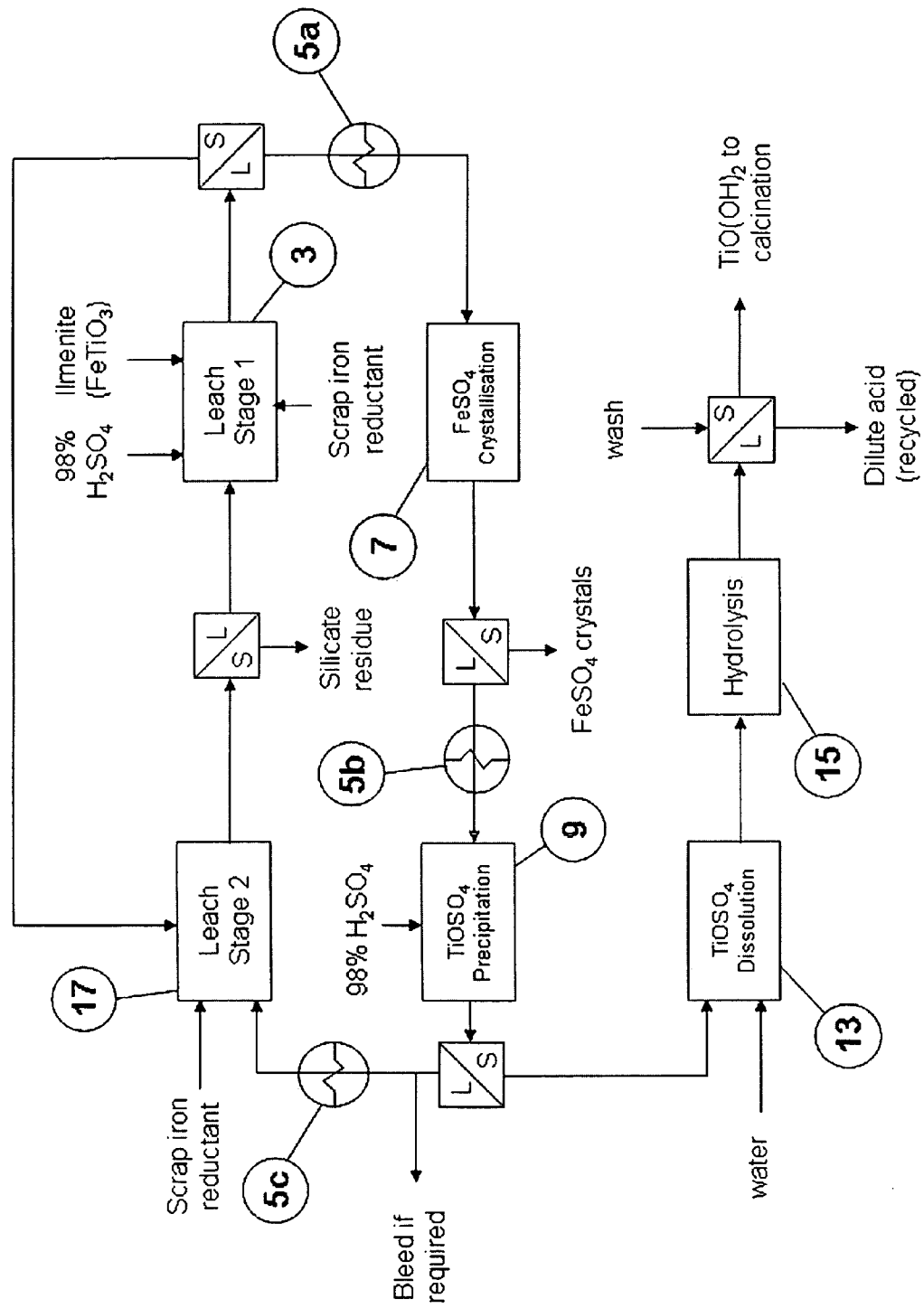
FIG. 1 is a flow sheet illustrating one embodiment of the present invention.

U.S. Pat. No. 3,760,058 in the name Langmesser et al (assigned to Farbenfabriken Bayer AK) discloses a process of the general type described above insofar as the process includes precipitation of titanyl sulfate from solution (step (c)) and subsequent dissolution (step (e)), hydrolysis (step (f)), and calcination (step (h)).

The reference herein to the Bayer US patent is not to be taken as an indication that the disclosure in the patent is part of the common general knowledge of the inventors.

The applicant has carried out research work on the above-described process and has identified a number of features that are not disclosed in the Bayer US patent that are important, separately and in combination, in order to operate the process effectively.

One such feature is the following steps.
(1) A further leach step (1) of leaching the residual solid phase from step (b) with a leach solution containing sulfuric acid and forming a leach liquor that includes an acidic solution of titanyl sulfate and iron sulfate and a residual solid phase;
(2) Separating the leach liquor and the residual solid phase from step (1);
(3) Supplying the separated leach liquor to the leach step (a) and/or mixing the separated leach liquor with the leach liquor from step (b).

Another such feature is a step of using at least part of the leach liquor remaining after separation of titanyl sulfate in step (d) as at least part of the leach solution in the leach step (a) and/or in the further leach step (1).

The use of the depleted leach liquor from the titanyl sulfate separation step (d) as the leach solution for leach step (a) and/or the further leach step (1) is an advantage of the process because it maximises the effective use of acid in the process.

Furthermore, the use of the depleted leach liquor allows a reduction or complete elimination of the production of waste acidic effluents and/or their neutralisation products, such as "brown gypsum".

Furthermore, the use of the depleted leach liquor allows recuperation of heat and also eliminates energy intensive acid recovery and evaporative concentration steps.

The leach step (a) and the further leach step (1) may be carried out in the same vessel.

In that event, the further leach step (1) includes returning the residual solid phase from step (b) to the vessel, wherein the residual solid phase forms part of the titaniferous material subjected to leaching in step (a).

Alternatively, the leach step (a) and the further leach step (1) may be carried out in separate vessels, with the residual solid phase from step (b) being supplied to the vessel or vessels for the further leach step (1).

In that event, preferably the process includes separating the leach liquor and a further residual solid phase formed in the further leach step (1).

The separated leach liquor may be supplied to the leach step (a).

Alternatively, the separated leach liquor may be mixed with the leach liquor from step (b) and thereafter the mixed leach liquor may be processed in the subsequent steps of the process.

The leach step (a) and/or the further leach step (1) may be carried out on a continuous basis or a batch basis.

The applicant has found in experimental work that it is important to carry out the leach step (a) and/or the further leach step (1) under leach conditions, described herein, that avoid an undesirable amount of premature hydrolysis to form hydrated titanium oxides.

In addition, the applicant has found in experimental work that it is important to carry out the leach step (a) and/or the further leach step (1) under leach conditions that avoid an undesirable amount of premature precipitation of titanyl sulfate.

Preferably the leach step (a) and/or the further leach step (1) include selecting and/or controlling the leach conditions in the leach step (a) and/or the further leach step (1) to avoid undesirable amounts of premature hydrolysis and undesirable amounts of premature precipitation.

The relevant leach conditions include any one or more than one of acid concentration, leach temperature and leach time.

Typically, on the basis of experimental work carried out by the applicant, the acid concentration in the leach step (a) and/or the further leach step (1) should be at least 350 g/l sulfuric acid throughout the leach step (a) and/or the further leach step (1) when operating at a leach temperature in the range of from 95° C. to the boiling point in order to avoid premature hydrolysis.

Typically, on the basis of experimental work carried out by the applicant, the acid concentration at the end of the leach step (a) and/or the further leach step (1) should be less than 450 g/l when operating at a leach temperature in the range of from 95° C. to the boiling point in order to avoid an undesirable amount of premature precipitation of titanyl sulfate.

It is noted that the acid concentration at the start of the leach step could be higher, typically as high as 700 g/l.

Typically, the leach conditions should be selected and/or controlled so that the titanium ion concentration in the leach liquor is less than 50 g/l in the leach liquor at the end of the leach step (a) and/or the further leach step (1).

Preferably the titanium ion concentration in the leach liquor is 40-50 g/l.

Preferably the process includes carrying out the leach step (a) in the presence of an additive that accelerates the rate of leaching the titaniferous material.

Preferably the process includes carrying out the further leach step (1) in the presence of an additive that accelerates the rate of leaching the titaniferous material.

The use of the leaching accelerant makes it possible to use less concentrated sulfuric acid than is required for the conventional sulfate process.

Preferably the leaching accelerant is selected from a group that includes iron, a titanium (III) salt, a thiosulfate salt, sulfur dioxide or any other reduced sulfur containing species.

Preferably the process includes carrying out the leach step (a) in the presence of a reductant that reduces ferric ions to ferrous ions in the acidic solution of titanyl sulfate and iron sulfate produced in the leach step (a).

Preferably the process includes carrying out the further leach step (1) in the presence of a reductant that reduces ferric ions to ferrous ions in the acidic solution of titanyl sulfate and iron sulfate produced in the leach step (a).

The reductant may be any suitable reductant.

Preferably the reductant is selected from a group that includes iron, a titanium (III) salt, a thiosulfate salt, sulfur dioxide or any other reduced sulfur containing species.

As is indicated above, the purpose of the reductant is to minimise the amount of iron in the trivalent ferric form and to maximise the amount of iron in the divalent ferrous form in the leach liquor produced in the leach step (a) and/or the further leach step (1). Maximising the amount of iron in the divalent ferrous form minimises the equilibrium concentrations of iron in the circuit, by promoting the precipitation of ferrous sulfate, for example $FeSO_4.7H_2O$.

Preferably the process includes the steps of precipitating iron sulfate from the leach liquor from step (b) and separating precipitated iron sulfate from the leach liquor prior to or after the titanyl sulfate precipitation step (d).

Preferably the titanyl sulfate separation step (d) includes adding sulfuric acid to the leach liquor to cause precipitation of titanyl sulfate.

Preferably the solution added to the leach step (a) and the further leach step (1) includes the depleted leach liquor remaining after separation of titanyl sulfate in step (d) and/or make-up fresh sulfuric acid.

Preferably the leach liquor remaining after separation of titanyl sulfate in step (d) has an acid concentration of at least 250 g/l sulfuric acid.

Preferably the leach liquor remaining after separation of titanyl sulfate in step (d) has an acid concentration of at least 350 g/l sulfuric acid.

Typically, the leach liquor remaining after separation of titanyl sulfate in step (d) has an acid concentration of at least 550 g/l sulfuric acid.

The precipitated titanyl sulfate from step (d) may be filtered.

The precipitated titanyl sulfate from step (d) may be washed with an acidic solution, for example, the liquid phase from step (g). Preferably the acid wash is a concentrated acid having at least 300 g/l acid. This step produces a stable filter cake which may be kept indefinitely.

The precipitated titanyl sulfate from step (d) may be washed with water or a dilute acidic solution. Preferably the acid wash is an acid having less than 150 g/l acid.

The purpose of the above-described wash steps is to displace impurities that otherwise may be entrained (physically or chemically) in the filter cake.

Preferably step (e) of redissolving the precipitated titanyl sulfate from step (d) includes washing a filter cake of the precipitated titanyl sulfate from step (d) with water or dilute acidic solution and allowing the washed filter cake to stand, typically for 3 hours, whereupon the titanyl sulfate liquefies and produces a concentrated titanyl sulfate solution.

Preferably the process includes controlling the hydrolysis step (f) to produce a selected particle size distribution of the hydrated titanium oxides product.

The controlled growth of coarse particles of hydrated titanium oxides in the hydrolysis step (f) is a significant departure from the conventional sulfate process in which there is a strong preference for producing fine particles in order to produce fine titania that meets the needs of the pigment industry, the major user of titania.

There are some applications, such as electrochemical reduction of titania, in which it is preferable to have a coarse feed of hydrated titanium oxides or a coarse feed of titania.

For these applications, preferably the process includes controlling the hydrolysis step (f) to produce coarse hydrated titanium oxides, i.e., oxides having a particle size of at least 0.005-0.01 mm (i.e. 5-10 micron).

Equally, there are other applications, such as production of pigments, in which it is preferable to have a fine feed of hydrated titanium oxides or a fine feed of titania.

For these applications, preferably the process includes controlling the hydrolysis step (f) to produce fine hydrated titanium oxides, i.e., oxides having a particle size of less than 0.0005 mm (i.e. 0.5 micron).

Preferably the process includes using the liquid phase produced in hydrolysis step (f) as a source of acid or water in other steps of the process. Typically, the liquid phase includes 100-500 g/l sulfuric acid. By way of example, the liquid phase may be used as a source of acid (and titanium values) by direct addition to leach liquor, depleted leach liquor or any one of steps (a) to (e) and the further leach step 1. By way of further example, the liquid phase may be used as a source of water for washing solid products from any one of steps (b), (d), (f) and (h).

Alternatively, the process may include treating the liquid phase produced in hydrolysis step (f) by neutralising the acid in the liquid phase with lime (CaO) and/or limestone ($CaCO_3$) and producing clean gypsum ($CaSO_4.2H_2O$).

It is known to produce gypsum by neutralising sulfuric acid in the liquid phase of the hydrolysis step in the conventional sulfate process. However, the gypsum product includes levels of impurities that reduce the market value of the gypsum. The liquid phase produced in hydrolysis step (f) also includes sulfuric acid that can be neutralised to produce gypsum. However, advantageously, this liquid phase is relatively free of contaminants because the titanyl sulfate precipitation step does not recover substantial amounts (if any) of species (such as iron, chromium, and manganese) that are in solution in the leach liquor that could act as contaminants. Therefore, gypsum produced from this leach liquor is relatively pure.

Preferably the process includes separating a bleed stream of the leach liquor to minimise the build-up of species (such as vanadium, chromium, and niobium) in solution in the leach liquor.

The above-described process may be carried out as a continuous process or as a batch process.

Preferably the titaniferous material is ilmenite or altered ilmenite.

The process of the present invention includes the following typical reactions.

Leaching:

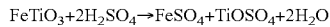
$$FeTiO_3 + 2H_2SO_4 \rightarrow FeSO_4 + TiOSO_4 + 2H_2O$$

Ferric Reduction:

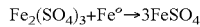
$$Fe_2(SO_4)_3 + Fe^o \rightarrow 3FeSO_4$$

Ferrous Sulfate Crystallisation:

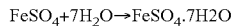
$$FeSO_4 + 7H_2O \rightarrow FeSO_4.7H_2O$$

Titanyl Sulfate Precipitation:

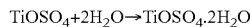
$$TiOSO_4 + 2H_2O \rightarrow TiOSO_4.2H_2O$$

Hydrolysis:

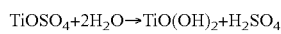
$$TiOSO_4 + 2H_2O \rightarrow TiO(OH)_2 + H_2SO_4$$

Calcination:

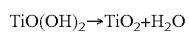
$$TiO(OH)_2 \rightarrow TiO_2 + H_2O$$

The applicant has carried out experimental work on a laboratory scale and a pilot plant scale in relation to the above-described process.

In summary, the applicant has made the following findings in the experimental scale work.

Fast leaching rates were achieved by leaching ilmenite in the presence of an accelerant, such as scrap iron, sodium thiosulfate, and sulfur dioxide.

Leach liquors containing up to 100 g/l titanium were produced.

Two stage leaching is an effective leaching option, and the two (or more than two) stage leaching can be carried out in a single vessel with return of residual solid phase to the vessel and addition of fresh ilmenite or in multiple vessels with the residual solid phase produced in a $1^{st}$ vessel being supplied to one or more than one other vessel.

There is a leach window (that is dependent on conditions such as acid concentration, leach temperature, and leach time and factors such as titanium ion concentration) in which it is possible to avoid premature hydrolysis and premature precipitation.

The present invention is described further with reference to the following examples.

EXAMPLE 1

Two Stage Leach

The laboratory scale work carried out by the applicant included leaching samples of heavy mineral sands concentrates containing >50% ilmenite.

The leaching work was carried out on a batch basis in 2 stages at atmospheric pressure with initial solids loadings of 500 g/l and 200 g/l, 30-50% w/w sulfuric acid at 95-120° C. for 3-5 hours in each stage, and with additions of accelerant/reductant in the form of iron, sodium thiosulfate and sulfur dioxide in each stage.

Table 1 is a summary of results of the leaching work.

TABLE 1

| Solids loading (in Stage 1) | After Stage 1 - wt % Ti in solution | After Stage 2 - wt % Ti in solution |
|---|---|---|
| 500 g/l | 72% | 87% |
| 200 g/l | 63% | 82% |

This example demonstrates that 2 stage leaching, under the conditions described above, is an effective leaching option.

EXAMPLE 2

Batch $1^{st}$ Stage Leach at Constant Acidity

Titanyl sulfate filtrate (700 ml) and water (300 ml) were mixed to produce a solution containing 441 g/l free $H_2SO_4$, 23.5 g/l $Fe^{2+}$, 5.2 g/l $Fe^{3+}$ and 14 g/l Ti. This solution was preheated to 110° C., in a glass reactor equipped with baffles and a Teflon agitator. Ilmenite (400 g) containing 30.4% Ti and 34.3% Fe and ground to 50% passing 32 μm, was added to this solution with sufficient agitation to fully suspend the solids. A 6 mm mild steel rod was immersed into the slurry at a rate of 0.5 cm/hour. Leaching was carried out for 5 hours. Aliquots of titanyl sulfate filtrate were added throughout to control the free acidity to 400 g/l. After 5 hours a sample was withdrawn and filtered. Analysis of the solution showed it to contain 373 g/l free $H_2SO_4$, 61.4 g/l $Fe^{2+}$, 1.1 g/l $Fe^{3+}$ and 26 g/l Ti. The slurry was filtered, and the solids washed with water and dried. The dried residue (313 g) was found by assay to contain 31.5% Ti and 33.5% Fe.

This example demonstrates that recycled titanyl sulfate filtrate may be used to leach ilmenite at constant acidity, to generate a usable Ti rich solution.

EXAMPLE 3

Batch Two Stage Leach at Constant Acidity

A synthetic solution (1000 ml) containing 402 g/l free H2SO4 was preheated to 105° C., in a glass reactor equipped with baffles and a Teflon agitator. Ilmenite (400 g) containing 30.4% Ti and 34.3% Fe and ground to 50% passing 32 µm, was added to this solution with sufficient agitation to fully suspend the solids. Iron filings (30 g) were added. Leaching was carried out for 5 hours. Aliquots of 98% sulfuric acid were added throughout to control the free acidity to 400 g/l. After 5 hours a sample was withdrawn and filtered. Analysis of the solution showed it to contain 387 g/l free $H_2SO_4$, 89.4 g/l $Fe^{2+}$, 0.4 g/l $Fe^{3+}$ and 48 g/l Ti. Heat and agitation were switched off and the slurry allowed to settle overnight. 750 ml of the clarified solution was removed and replaced with an equal volume of fresh synthetic solution. Heat and agitation were reinstated, and 30 g of iron filings were added. Leaching was continued at 110° C. for 5 hours. Aliquots of 98% sulfuric acid were added throughout to control the free acidity to 400 g/l. After 5 hours a sample was withdrawn and filtered. Analysis of the solution showed it to contain 373 g/l free $H_2SO_4$, 106 g/l $Fe^{2+}$, 0.2 g/l $Fe^{3+}$ and 38 g/l Ti. The slurry was filtered and the solids were washed with water and dried. The dried residue (57.5 g) was found by assay to contain 33.0% Ti and 23.7% Fe.

This example demonstrates that two stages of ilmenite leaching may be carried out at constant acidity, with inter-stage thickening, to generate usable Ti rich solution from both stages of leaching, and with high overall Ti extraction efficiency.

This example also demonstrates that concentrated acid may be used for acidity control, and that finely divided iron may alternatively be used to accelerate leaching.

EXAMPLE 4

Batch $1^{st}$ Stage Leach with Reducing Acidity

Titanyl sulfate filtrate (1000 ml) containing 677 g/l free H2SO4, 37.4 g/l $Fe^{2+}$, 6.8 g/l $Fe^{3+}$ and 23 g/l Ti was preheated to 110° C. in a glass reactor equipped with baffles and a Teflon agitator. Ilmenite (400 g) containing 30.4% Ti and 34.3% Fe and ground to 50% passing 32 µm, was added to this solution with sufficient agitation to fully suspend the solids. A 6 mm mild steel rod was immersed into the slurry at a rate of 0.5 cm/hour. Leaching was carried out for 6 hours. After 6 hours a sample was withdrawn and filtered. Analysis of the solution showed it to contain 446 g/l free $H_2SO_4$, 121.8 g/l $F^{e2+}$, 18.4 g/l $F^{e3}+$ and 67 g/l Ti. The slurry was filtered, and the solids washed with water and dried. The dried residue (208 g) was found by assay to contain 31.7% Ti and 32.4% Fe.

This example demonstrates batch leaching of ilmenite using undiluted titanyl sulfate filtrate, with the acidity reducing throughout the experiment.

EXAMPLE 5

Batch $2^{nd}$ Stage Leach with Reducing Acidity

Synthetic titanyl sulfate filtrate (1000 ml) containing 593 g/l free $H_2SO_4$ was preheated to 105° C. in a glass reactor equipped with baffles and a Teflon agitator. First stage leach residue (400 g) containing 32.0% Ti and 31.3% Fe was added to this solution with sufficient agitation to fully suspend the solids. A 6 mm mild steel rod was immersed into the slurry at a rate of 0.5 cm/hour. Leaching was carried out for 6 hours. After 6 hours a sample was withdrawn and filtered. Analysis of the solution showed it to contain 476 g/l free $H_2SO_4$, 29.0 g/l $Fe^{2+}$, 10.4 g/l $Fe^{3+}$ and 32.5 g/l Ti. The slurry was filtered, and the solids washed with water and dried. The dried residue (267 g) was found by assay to contain 31.9% Ti and 30.7% Fe.

This example demonstrates additional stages of leaching may also be carried out on the leach residue from a previous stage of leaching.

EXAMPLE 6

$TiOSO_4.2H_2O$ Batch Precipitation and Redissolution

Sulfuric acid (98%, 450 g) was mixed with an ilmenite leach solution (1500 ml) containing 440 g/l free $H_2SO_4$, 35.4 g/l Fe2+, 7.4 g/l Fe3+ and 29 g/l Ti in a glass reactor equipped with baffles and a Teflon agitator. The resulting solution was heated to 110° C. and titanyl sulfate crystals (4 g) were added. The mixture was stirred at this temperature for a total of 6 hours, during which a thick precipitate formed. The slurry was filtered and the cake was washed with water to give a wet filter cake (238 g). The filtrate contained 16 g/l Ti, 638 g/l $H_2SO_4$ and 48 g/l Fe, of which 6.6 g/l was as $Fe^{3+}$. The filter cake dissolved after 3 hours to produce a solution containing 160 g/l Ti and 8.3 g/l Fe.

This example shows that $TiOSO_4.2H_2O$ crystals may be batch precipitated from an ilmenite leach solution prepared in the manner of Examples 2-5, 7 and 8 by the addition of sulfuric acid and that a high strength solution suitable for pigment manufacturing may be generated by dissolution of the crystals.

EXAMPLE 7

Batch 1 st Stage Leach with using Titanyl Sulfate Filtrate Containing Residual $TiOSO_4.2H_2O$ Solids Titanyl sulfate filtrate (1000 ml) containing 657 g/l free $H_2SO_4$, 35.7 g/l $Fe^{2+}$, 6.8 g/l $Fe^{3+}$ and 19 g/l Ti was preheated to 110° C. in a glass reactor equipped with baffles and a Teflon agitator. Ilmenite (400 g) containing 30.4% Ti and 34.3% Fe and ground to 50% passing 32 µm, was added to this solution with sufficient agitation to fully suspend the solids. A small amount (0.1 g) of $TiOSO_4.2H_2O$ was also added to simulate carryover solids. A 6 mm mild steel rod was immersed into the slurry at a rate of 0.5 cm/hour. Leaching was carried out for 5 hours, without evidence of thickening through the precipitation of $TiOSO_4.2H_2O$ crystals. After 5 hours a sample was withdrawn and filtered. Analysis of the solution showed it to contain 466 g/l free $H_2SO_4$, 72 g/l $Fe^{2+}$, 15.6 g/l $Fe^{3+}$ and 55 g/l Ti. The slurry was filtered, and the solids washed with water and dried. The dried residue (208 g) was found by assay to contain 31.4% Ti and 32.4% Fe.

This example demonstrates that contamination of the titanyl sulfate filtrate produced in the manner of Examples 6, 9 and 10 is not detrimental to leaching of ilmenite.

EXAMPLE 8

Continuous Leach at Constant Acidity

A single stage leach pilot plant was assembled, consisting of 5 stirred FRP tanks of 10 L capacity each, equipped with FRP double axial turbines, and silica jacketed electric immersion heaters. Ilmenite ground to 50% passing 32 μm was fed to the first tank at 750 g/hour using a screw feeder. Synthetic hydrolysis filtrate of composition 400 g/l free $H_2SO_4$ was also pumped into the first tank at a rate of 41.7 ml/min. The temperature was maintained at 105° C. in tanks 1 and 2, and at 110° C. in the remaining 3 tanks. Concentrated sulfuric acid (98%) was added to the first two tanks to control the acidity to 400 g/l. Mild steel rods of diameter 10 mm were inserted into each tank at a rate of 1 cm/hr. Slurry was thence allowed to flow by gravity to a FRP thickener equipped with FRP rakes. Thickener overflow solution and underflow slurry were collected and stored. The pilot plant was operated continuously for 70 hours. During the final 24 hours of operation the average composition of the solution in each tank was as follows:

TABLE 2

Continuous Pilot Plant 1st Stage Leach Results

| | Free Acid g/l | $Fe^{2+}$ g/l | $Fe^{3+}$ g/l | Ti g/l |
|---|---|---|---|---|
| Tank 1 | 439.3 | 28.1 | 2.0 | 12.0 |
| Tank 2 | 406.3 | 48.9 | 2.3 | 19.0 |
| Tank 3 | 394.4 | 65.6 | 2.6 | 23.3 |
| Tank 4 | 381.1 | 74.9 | 6.7 | 28.3 |
| Tank 5 | 421.0 | 84.2 | 18.9 | 42.7 |
| Thickener overflow | 430.7 | 85.5 | 19.4 | 42.0 |

On cooling the excess $FeSO_4$ contained in the solution crystallised out in the form of dense green $FeSO_4 \cdot 7H_2O$ crystals.

This example demonstrates that the leaching of ilmenite may be carried out continuously in the manner of Examples 2-3.

EXAMPLE 9

Continuous Precipitation of $TiOSO_4 \cdot 2H_2O$

Ilmenite leach solution (14.2 L) containing 337 g/l free $H_2SO_4$, 36.3 g/l $Fe^{2+}$, 20 g/l $Fe^{3+}$ and 33.3 g/l Ti was mixed in an agitated fiberglass reactor with titanyl sulfate filtrate (19.1 L) containing 657 g/l free $H_2SO_4$, 23.5 g/l $Fe^{2+}$, 10 g/l $Fe^{3+}$ and 11.1 g/l Ti. Sulfuric acid (98%, 3.8 L) was then added along with titanyl sulfate crystals (200 g) and the temperature was raised to 110° C. The reactor was allowed to stir at temperature for 4 hours before the heaters were turned off. After standing overnight the reactor was reheated to 110° C. and a sample taken and filtered. The titanium concentration in the liquor had dropped from an initial combined level of 18.5 g/l to 9.4 g/l. The feed and product pumps were started and set to flowrates of 300 ml/min, to allow for a 2 hour residence time with a constant combined feed solution containing 18.5 g/l Ti and 657 g/l $H_2SO_4$. The precipitator was run continuously this way for 6 hours producing over 100 L of titanyl sulfate slurry. Regular samples were taken from the reactor and filtered and analysed. These filtrate samples gave average concentrations of 11.3 g/l Ti and 657 g/l $H_2SO_4$. The precipitated titanyl sulfate dihydrate ($TiOSO_4 \cdot 2H_2O$) was separated from the slurry using a plate and frame filter, giving a filter cake (8 kg).

This example demonstrates that $TiOSO_4 \cdot 2H_2O$ may be continuously precipitated, in the manner of Example 6.

EXAMPLE 10

Repulp and Redissolution of $TiOSO_4 \cdot 2H_2O$

Titanyl sulfate filter cake (19 kg) produced using the process described in Example 9 was repulped into a pumpable slurry using a solution containing 400 g/l $H_2SO_4$ (4 L) mixed with repulp filtrate (36 L) containing 485 g/l free $H_2SO_4$, 6.7 g/l $Fe^{2+}$, 9.6 g/l $Fe^{3+}$ and 5.9 g/l Ti. The slurry was allowed to stir for 15 minutes then was filtered using a plate and frame filter. A sample of the filtrate from this filtering step was analysed and was found to contain 510 g/l free $H_2SO_4$, 8.9 g/l $Fe^{2+}$, 10.7 g/l $Fe^{3+}$ and 7.4 g/l Ti. Water (50 L) was pumped through the filter to wash the solids. A sample of the filtrate from the washing step was analysed and found to contain 137 g/l free $H_2SO_4$, 2.2 g/l $Fe^{2+}$, 3 g/l $Fe^{3+}$ and 3.3 g/l Ti. The washed solids were collected and dissolved in water overnight. The resulting solution was filtered to remove fine, undissolved solids, which were predominately silica. The solution was found by assay to contain 467 g/l total $H_2SO_4$, 1.7 g/l $Fe^{2+}$, 6.5 g/l $Fe^{3+}$ and 194 g/l Ti.

This example demonstrates that $TiOSO_4 \cdot 2H_2O$ crystals prepared in the manner of Example 9 may be dissolved in water to produce a high strength solution.

EXAMPLE 11

Blumenfeld Type Hydrolysis of Redissolved $TiOSO_4$

Water (50 ml) was preheated to 96° C. in a glass reactor equipped with baffles and a polypropylene agitator. A stock of titanyl sulfate solution containing 343 g/l total acid and 118 g/l Ti was prepared by the procedure outlined in Example 1. The stock solution was treated with metallic Al to generate 2 g/l $Ti^{3+}$, and was adjusted with 98% sulfuric acid an acid to titania ratio of 2.0 by the addition of 50 g/l $H_2SO_4$. A sample (230 ml) of the resulting solution, which contained 383 g/l total acid and 115 g/l Ti, was heated to 98° C. An aliquot of this solution (1.5 ml) was added to the preheated water, followed by rapid addition of the remaining solution after 30 seconds. The mixture was then heated to the boiling point (104° C.) and gentle boiling was maintained for 5 hours. Aliquots of water (5 ml each) were added each hour. A sample of solution taken at the end of this time was found by assay to contain 13 g/l Ti and 304 g/l $H_2SO_4$. Rutile seed (3% $TiO_2$ basis) was then added and the slurry was filtered and washed well with water to give a wet filter cake (85 g). After reductive acid leaching, addition of zinc sulfate, potassium sulfate and orthophosphoric acid and calcination by conventional methods known to practitioners of the art, the calcine was found to contain 99% rutile with an average crystal size that was suitable pigment for pigment production.

This example demonstrates that high strength solution produced in the manner of Examples 6 and 10 may be used in the conventional Blumenfeld process for the production of pigmentary $TiO_2$.

EXAMPLE 12

Mecklenberg Type Hydrolysis of Redissolved TiOSO$_4$

A stock of titanyl sulfate solution containing 328 g/l total acid and 117 g/l Ti was prepared by the procedure outlined in Example 2. The stock solution was treated with metallic Al to generate 2 g/l Ti$^{3+}$, and was adjusted with 98% sulfuric acid an acid to titania ratio of 1.75 by the addition of 13 g/l H$_2$SO$_4$. A sample (250 ml) of the resulting solution, which contained 338 g/l total acid and 116 g/l Ti, was heated to 60° C. in a glass reactor equipped with baffles and a polypropylene agitator. Rutile seed was added as a slurry (3% TiO$_2$ basis) in 4 equal aliquots at 1 minute intervals. The mixture was held at 60° C. for 1 hour. The temperature was then raised to 104° C. at a rate of 1° C./min. An aliquot of water (5 ml) was added 197 min after the start. A sample of solution taken after 6 hours was found by assay to contain 353 g/l free H$_2$SO$_4$ and 3.1 g/l Ti. The slurry was filtered and washed with water to give a wet cake (116 g). After reductive acid leaching, addition of zinc sulfate, potassium sulfate and orthophosphoric acid and calcination by conventional methods known to practitioners of the art, the calcine was found by X-ray diffraction to contain 97% rutile with an average crystal size that was suitable pigment for pigment production.

This example demonstrates that high strength solution produced in the manner of Examples 6 and 10 may be used in the conventional Mecklenberg process for the production of pigmentary TiO$_2$.

The improved sulfate process of the present invention is now described further with reference to the accompanying flow sheet.

With reference to the flow sheet, in a Stage 1 Leach step ilmenite, leach liquor containing between 400 and 700 g/l sulfuric acid from a Stage 2 Leach step, fresh concentrated (98%) sulfuric acid, and a reductant in the form of scrap iron are supplied to a digester 3. The process operates on a continuous basis with the feed materials being supplied continuously to the digester 3 and reacted and unreacted materials being discharged continuously from the digester 3.

The Stage 1 Leach step solubilises a substantial component of the ilmenite supplied to the digester 3 and produces a leach liquor that contains titanyl sulfate and iron sulfate in solution. Typically, at the end of the leach the leach liquor contains 20-100 and preferably 40-50 g/l Ti and 50-100 g/l Fe.

The leach liquor and partially reacted and unreacted ilmenite that are discharged continuously from the digester 3 are subjected to a solid/liquid separation step.

The solid phase from the solid/liquid separation step, which contains unreacted and partially reacted ilmenite, is transferred to the Stage 2 Leach step. The Stage 2 Leach step is discussed further below.

The leach liquor from the solid/liquid separation step is transferred via a heat exchanger 5a to an iron sulfate crystallisation reactor 7.

The heat exchanger 5a cools the leach liquor from a temperature of the order of 110° C. to 60° C. The heat extracted by the heat exchanger 5a is used elsewhere in the process, as discussed further below.

The leach liquor is cooled further, typically to 10-30° C. in the iron sulfate crystallisation reactor 7. Cooling the leach liquor precipitates iron sulfate from the leach liquor in the iron sulfate crystallisation reactor 7. Typically, the crystallisation step reduces the concentration of Fe in the leach liquor to 40-50 g/l.

The leach liquor containing precipitated iron sulfate that is discharged from the crystallisation reactor 7 is subjected to a further solid/liquid separation step which separates the precipitated iron sulfate.

The solid phase from the solid/liquid separation step contains iron sulfate. The solid phase may also contain some species such as iron, manganese and aluminium. The solid phase is a by-product of the process.

The leach liquor from the solid/liquid separation step is transferred via a heat exchanger 5b to a titanyl sulfate crystallisation reactor 9 and titanyl sulfate is precipitated from the leach liquor.

The precipitation of titanyl sulfate is caused by the addition of concentrated (98%) sulfuric acid to increase the concentration of acid in the leach liquor to 650 g/l. The increased acid concentration destabilises the titanyl sulfate in solution and results in precipitation. Precipitation may also be facilitated by the addition of titanyl sulfate seed. The leach liquor has an approximate average residence time of 3 hours in the reactor 9 and is at a temperature of 110° C.

The leach liquor discharged from the iron sulfate crystallisation reactor 7 is typically at a temperature of 30° C. The leach liquor is heated to the above-stated titanyl sulfate precipitation temperature of 110° C. by the heat exchanger 5b and the acid supplied to the titanyl sulfate crystallisation reactor 9. Conveniently, the heat input for the heat exchanger 5b is the heat recovered from the leach liquor by the heat exchanger 5a.

The precipitated titanyl sulfate is separated from the leach liquor and washed in a further solid/liquid separation step.

The separated precipitate of titanyl sulfate is transferred to a holding tank 13 and allowed to dissolve into a liquid form and thereafter the aqueous solution of titanyl sulfate is transferred to an hydrolysis reactor 15.

If the objective of the process is to produce feed material for pigment production, the aqueous solution of titanyl sulfate may be processed in the hydrolysis reactor 15 by conventional hydrolysis options such as the Blumenfeld and Mecklenberg processes and the modified Blumenfeld process disclosed in Bayer U.S. Pat. No. 3,760,058 mentioned above.

If the objective of the process is to produce coarser feed material than that required for pigment production, the aqueous solution of titanyl sulfate is processed in the hydrolysis reactor 15 as described hereinafter.

Specifically, at start-up, the reactor 15 contains a starting solution of sulfuric acid and solids. Typically, the solution contains 10-200 g/l acid and solids density of 10-200 g/l.

The titanyl sulfate solution is added at a controlled rate to the starting solution. The addition of the solution results in the reactor 15 filling up to capacity and thereafter overflowing, whereafter the rate of overflow from the reactor 15 matches the rate of supply of titanyl sulfate solution.

In the reactor 15 the sulfate ions in the titanyl sulfate solution are displaced by hydroxyl ions, with the result that hydrated titanium oxides precipitate from the solution.

The solids in the starting solution act as seed for precipitation. Typically, the solids are hydrated titanium oxide or titanium dioxide particles.

Typically, the residence time of titanyl sulfate solution in the reactor 15 varies between 3 and 12 hours.

Subject to temperature and time conditions and control of solution concentration, there is controlled crystal growth in the hydrolysis reactor 15. Controlled crystal growth provides an opportunity to produce titania of coarse particle sizes. In particular, controlled crystal growth provides an opportunity to produce coarse titania of greater than 0.005 mm (5 micron) which can be used by way of example in the electrochemical reduction of titania to produce titanium. One important parameter for controlling crystal growth is the concentration of titanium in solution in the reactor 15. Specifically, it is preferred that the concentration be relatively low, of the order of 10 g/l, in the reactor 15 to achieve growth rather than nucleation of titanium oxide particles.

The hydrolysis reactor 15 may be operated in batch mode. More preferably, the reactor is operated in continuous mode.

Moreover, if required, make-up water and solids can be added to the reactor 15.

In either the conventional pigment production hydrolysis or the above coarse particle size hydrolysis, the overflow from the reactor 15 is collected as the product of the reactor 15.

The product from the hydrolysis reactor 15 is subjected to a solid/liquid separation step, which is facilitated by providing wash water.

The solid phase from the solid/liquid separation step, which contains hydrated titanium oxides, is transferred to a calciner (not shown) and is calcined to produce titania. Depending on the circumstances, the solid phase may be calcined in the presence of additives conventionally used during manufacture of titanium dioxide pigments.

In view of the efficiency of the titanyl sulfate precipitation step in confining precipitation substantially to titanium compounds, typically, the process produces titanium of very high purity, ie at least 99 wt. %.

Part or all of the liquid phase from the solid/liquid separation step may be reused in the process, for example as a source of acid in the Stage 2 Leach step and/or as a source of water in washing steps in the process, as permitted by the overall water balance.

Alternatively, the liquid phase from the solid/liquid separation step, which contains sulfuric acid, may also be neutralised with lime and/or limestone and thereby produces a gypsum product. In view of the efficiency of the titanyl sulfate precipitation step in confining precipitation to titanium compounds, the liquid phase contains minimal levels of contaminants (such as iron, vanadium and chromium) and therefore the gypsum is "clean" gypsum that is commercially valuable in applications (such as the manufacture of cement). This enables a substantial reduction in waste when compared with the conventional sulfate process.

The depleted leach liquor from the titanyl sulfate precipitation reactor 9 contains relatively high levels of sulfuric acid (450-700 g/l). The depleted leach liquor is transferred to the above-mentioned Stage 2 Leach step and is used as a leach liquor. In effect, the titanyl sulfate precipitation reactor 9 recovers sulfuric acid and the acid is thereafter used productively in the process. This enables a substantial reduction in waste when compared with the conventional sulfate process. In addition, the use of the solution as part of the acid feed for the process reduces the amount of fresh acid that is required in the process.

Furthermore, employment of the depleted leach liquor for leaching allows the sulfuric acid added to the titanyl sulfate precipitation step to be used productively. Thus precipitation of titanyl sulfate (c) does not increase the overall process acid consumption.

The Stage 2 Leach step is carried out in a digester 17.

The depleted leach liquor supplied to the digester 17 and make up sulfuric acid (if required) leaches the unreacted and partially reacted ilmenite from the Stage 1 Leach and solubilises approximately 50% of the remaining ilmenite.

The product from the Stage 2 Leach is subjected to a solid/liquid separation step.

The leach liquor from the solid/liquid separation step, which typically contains 400-700 g/l sulfuric acid, is transferred to the Stage 1 Leach, as mentioned above.

The solid phase from the solid/liquid separation step is substantially made up of silicate residue, and is a waste product of the process.

Many modifications may be made to the process of the present invention described above without departing from the spirit and scope of the present invention.

By way of example, whilst the above-described flow sheet describes that the Stage 1 and Stage 2 Leach steps are carried out in single digesters 3 and 17, respectively, the present invention is not so limited and extends to arrangements that include multiple digesters for each stage.

In addition, whilst the above-described flow sheet describes that the Stage 1 and Stage 2 Leach steps are carried out in separate digesters 3 and 17, respectively, the present invention is not so limited and extends to arrangements in which leaching of titaniferous material is carried out in a single digester, with return of residual solid phase to the digester and direct supply of depleted leach liquor from the titanyl sulfate precipitation step 9 to the digester.

In addition, whilst the above-described flow sheet describes that the depleted leach liquor from the titanyl sulfate precipitation step 9 is transferred to the Stage 2 Leach step and is used as a leach solution in that step, the present invention is not so limited and extends to arrangements in which the depleted leach liquor is transferred separately to the Stage 1 Leach step and the Stage 2 leach step and is used as a leach solution in those steps.

The invention claimed is:

1. A sulfate process for producing titania from a titaniferous material comprising sequentially:
   (a) leaching the titaniferous material with a leach solution containing sulfuric acid and forming a leach liquor that includes an acidic solution of titanyl sulfate ($TiOSO_4$) and iron sulfate ($FeSO_4$);
   (b) separating the leach liquor and a residual solid phase from the leach step (a);
   (c) precipitating titanyl sulfate from the leach liquor from step (b);
   (d) separating the precipitated titanyl sulfate from the leach liquor to form a depleted liquor;
   (e) redissolving the precipitated titanyl sulfate;
   (f) hydrolysing the redissolved titanyl sulfate and forming a solid phase containing hydrated titanium oxides and a liquid phase;
   (g) separating the solid phase containing hydrated titanium oxides and the liquid phase;
   (h) calcining the solid phase from step (g) and forming titania; and
   (i) removing iron sulfate from one or both of the leach liquor from step (b) and the depleted liquor from step (d).

2. The process of claim 1 further comprising a further leach step (1) of leaching the residual solid phase from step (b) with a leach solution containing sulfuric acid and forming a leach liquor that includes an acidic solution of titanyl sulfate and iron sulfate and a residual solid phase.

3. The process of claim 2 further comprising separating the leach liquor and the residual solid phase from step (1).

4. The process of claim 3 further comprising one or both of supplying the separated leach liquor to the leach step (a) and mixing the separated leach liquor with the leach liquor from step (b).

5. The process of claim 2 further comprising one or both of a step of using at least part of the leach liquor remaining after separation of titanyl sulfate in step (d) as at least part of the leach solution in the leach step (a) and in the further leach step (1).

6. The process of claim 2 wherein the leach step (a) and the further leach step (1) are carried out in the same vessel and the further leach step (1) includes returning the residual solid phase from step (b) to the vessel, wherein the residual solid phase forms part of the titaniferous material subjected to leaching in step (a).

7. The process of claim 2 wherein the leach step (a) and the further leach step (1) are carried out in separate vessels, with the residual solid phase from step (b) being supplied to one or more vessels for the further leach step (1).

8. The process of claim 7 further comprising separating the leach liquor and the further residual solid phase formed in the further leach step (1).

9. The process of claim 8 further comprising supplying the separated leach liquor to the leach step (a).

10. The process of claim 8 further comprising mixing the separated leach liquor with the leach liquor from step (b) and thereafter processing the mixed leach liquor in subsequent steps of the process.

11. The process of claim 2 further comprising one or both of carrying out the leach step (a) and the further leach step (1) under leach conditions that avoid an undesirable amount of premature hydrolysis to form hydrated titanium oxides.

12. The process of claim 2 further comprising one or both of carrying out the leach step (a) and the further leach step (1) under leach conditions that avoid an undesirable amount of premature precipitation of titanyl sulfate.

13. The process of claim 2 wherein one or both of the leach step (a) and the further leach step (1) include selecting and/or controlling the leach conditions in the leach step (a) and/or the further leach step (1) to avoid undesirable amounts of premature hydrolysis to form hydrated titanium oxides and undesirable amounts of premature precipitation of titanyl sulfate.

14. The process of claim 11 wherein the leach conditions include any one or more than one of acid concentration, leach temperature and leach time.

15. The process of claim 2 wherein one or both of the leach step (a) and the further leach step (1) include one or both of selecting and controlling the acid concentration in one or both of the leach step (a) and the further leach step (1) to be at least 350 g/l sulfuric acid throughout one or both of the leach step (a) and the further leach step (1) when operating at a leach temperature in a range of from 95° C. to the boiling point in order to avoid premature hydrolysis.

16. The process of claim 2 wherein one or both of the leach step (a) and the further leach step (1) include one or both of selecting and controlling the acid concentration at the end of one or both of the leach step (a) and the further leach step (1) to be less than 450 g/l when operating at a leach temperature in a range of from 95° C. to the boiling point in order to avoid an undesirable amount of premature precipitation of titanyl sulfate.

17. The process of claim 15 wherein the acid concentration at the start of the leach step is at least 700 g/l.

18. The process of claim 2 wherein one or both of the leach step (a) and the further leach step (1) include one or both of selecting and controlling the titanium ion concentration in the leach liquor to be less than 50 g/l in the leach liquor at the end of one or both of the leach step (a) and the further leach step (1).

19. The process of claim 18 wherein the titanium ion concentration in the leach liquor is 40-50 g/l.

20. The process of claim 1 further comprising carrying out the leach step (a) in the presence of a leaching accelerant that accelerates the rate of leaching the titaniferous material.

21. The process of claim 2 further comprising carrying out the further leach step (1) in the presence of an additive that accelerates the rate of leaching the titaniferous material.

22. The process of claim 21 wherein the leaching accelerant is selected from the group consisting of iron, a titanium (III) salt, a thiosulfate salt, sulfur dioxide, a reduced sulfur containing species, and mixtures thereof.

23. The process of claim 1 further comprising carrying out the leach step (a) in the presence of a reductant that reduces ferric ions to ferrous ions in the acidic solution of titanyl sulfate and iron sulfate produced in the leach step (a).

24. The process of claim 2 further comprising carrying out the further leach step (1) in the presence of a reductant that reduces ferric ions to ferrous ions in the acidic solution of titanyl sulfate and iron sulfate produced in the leach step (a).

25. The process of claim 24 wherein the reductant is selected from a the group consisting of iron, a titanium (III) salt, a thiosulfate salt, sulfur dioxide, a reduced sulfur containing species, and mixtures thereof.

26. The process of claim 1 wherein step (i) of removing iron sulfate includes the steps of precipitating iron sulfate from the leach liquor from step (b) and separating precipitated iron sulfate from the leach liquor prior to or after the titanyl sulfate precipitation step (c).

27. The process of claim 1 wherein the titanyl sulfate precipitation step (c) includes adding sulfuric acid to the leach liquor to cause precipitation of titanyl sulfate.

28. The process of claim 27 wherein the leach liquor remaining after separation of titanyl sulfate in step (d) has an acid concentration of at least 250 g/l sulfuric acid.

29. The process of claim 27 wherein the leach liquor remaining after separation of titanyl sulfate in step (d) has an acid concentration of at least 350 g/l sulfuric acid.

30. The process of claim 27 wherein the leach liquor remaining after separation of titanyl sulfate in step (d) has an acid concentration of at least 550 g/l sulfuric acid.

31. The process of claim 1 further comprising washing the precipitated titanyl sulfate from step (d) with an acidic solution.

32. The process of claim 31 wherein the acid wash is a concentrated acid having an acid concentration of at least 300 g/l acid.

33. The process of claim 31 wherein the acid wash is a dilute acidic solution having an acid concentration of less than 150 g/l acid.

34. The process of claim 1 wherein step (e) of redissolving the precipitated titanyl sulfate from step (d) includes washing a filter cake of the precipitated titanyl sulfate from step (d) with water or dilute acidic solution and allowing the washed filter cake to stand whereupon the titanyl sulfate liquefies and produces a concentrated titanyl sulfate solution.

35. The process of claim 1 includes controlling the hydrolysis step (f) to produce a selected particle size distribution of the hydrated titanium oxides product.

36. The process of claim 1 includes controlling the hydrolysis step (f) to produce coarse hydrated titanium oxides having a particle size of at least 0.005 mm.

37. The process of claim 1 further comprising controlling the hydrolysis step (f) to produce fine hydrated titanium oxides having a particle size of less than 0.0005 mm.

38. The process of claim 1 further comprising using the liquid phase produced in hydrolysis step (f) as a source of acid or water in other steps of the process.

39. The process of claim 38 wherein the liquid phase includes 100-500 g/l sulfuric acid.

40. The process of claim 2 further comprising adding the liquid phase produced in hydrolysis step (f) to one or more of the leach solution and leach liquor in any one of steps (a) to (d), the depleted liquor of step d, and the further leach step 1.

41. The process of claim 1 further comprising treating the liquid phase produced in hydrolysis step (f) by neutralising the acid in the liquid phase with lime (CaO) and/or limestone ($CaCO_3$) and producing clean gypsum ($CaSO_4 \cdot 2H_2O$).

* * * * *